(12) United States Patent
Sowadsky et al.

(10) Patent No.: US 6,195,745 B1
(45) Date of Patent: *Feb. 27, 2001

(54) PIPELINE THROUGHPUT VIA PARALLEL OUT-OF-ORDER EXECUTION OF ADDS AND MOVES IN A SUPPLEMENTAL INTEGER EXECUTION UNIT

(75) Inventors: Elliot A. Sowadsky, Santa Clara; Larry Widigen, Salinas; David L. Puziol, Sunnyvale; Korbin S. Van Dyke, Fremont, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/080,492

(22) Filed: May 18, 1998

Related U.S. Application Data

(63) Continuation of application No. 08/801,709, filed on Feb. 14, 1997, now Pat. No. 5,802,339, and a division of application No. 08/340,183, filed on Nov. 15, 1994, now Pat. No. 5,675,758.

(51) Int. Cl.[7] .................................................. C06F 9/30
(52) U.S. Cl. ........................... 712/216; 712/217; 712/219
(58) Field of Search ................................. 712/217, 216, 712/218, 23, 200, 205, 122, 144, 203, 206; 364/431.1; 711/122, 144

(56) References Cited

U.S. PATENT DOCUMENTS

| | | | |
|---|---|---|---|
| 4,991,080 | * 2/1991 | Emma et al. | 712/206 |
| 5,226,126 | 7/1993 | McFarland et al. | 712/218 |
| 5,404,552 | 4/1995 | Ikenaga | 712/41 |
| 5,430,851 | 7/1995 | Hirata et al. | 712/212 |
| 5,434,986 | 7/1995 | Kuslak et al. | 712/216 |
| 5,442,757 | 8/1995 | McFarland et al. | 712/218 |
| 5,487,156 | 1/1996 | Popescu et al. | 712/217 |
| 5,497,499 | 3/1996 | Garg et al. | 712/217 |
| 5,628,021 | 5/1997 | Iadonato et al. | 712/23 |
| 5,632,023 | 5/1997 | White et al. | 712/218 |
| 5,651,125 | * 7/1997 | Witt et al. | 712/218 |
| 5,675,758 | * 10/1997 | Sowadsky et al. | 712/217 |
| 5,778,208 | * 7/1998 | Eickemeyer et al. | 712/203 |
| 5,778,210 | * 7/1998 | Henstrom et al. | 712/210 |
| 5,802,339 | * 9/1998 | Sowadsky et al. | 712/217 |
| 5,974,523 | * 10/1999 | Glew et al. | 712/23 |

OTHER PUBLICATIONS

G.S. Sohi, "Instruction Issue Logic for High–Performance, Interruptible, Multiple Functional Unit, Pipelined Computers," *IEEE Transactions on Computers*, vol. 39, No. 3, pp. 349–359 (Mar. 1990).

\* cited by examiner

*Primary Examiner*—William M. Treat
*Assistant Examiner*—Walter Benson
(74) *Attorney, Agent, or Firm*—Townsend and Townsend and Crew

(57) ABSTRACT

The existing execution units of a high-performance processor are augmented by tile addition of a supplemental integer execution unit, termed the Add/Move Unit (AMU), which performs select adds and moves in parallel and out-of-order with respect to the other execution units. At small incremental cost, AMU enables better use of the expensive limited resources of an existing Address Preparation unit (AP), which handles linear and physical address generation for memory operand references, control transfers, and page crosses. AMU removes data dependencies and thereby increases the available instruction level parallelism. The increased instruction level parallelism is readily exploited by the processor's ability to perform out-of-order and speculative execution, and performance is enhanced as a result.

35 Claims, 4 Drawing Sheets

PIPELINE THROUGHPUT VIA PARALLEL OUT-OF-ORDER EXECUTION OF ADDS AND MOVES IN A SUPPLEMENTAL INTEGER EXECUTION UNIT

CROSS REFERENCE TO RELATED APPLICATIONS

This is a continuation of U.S. application Ser. No. 08/801,709, filed Feb. 14, 1997, now U.S. Pat. No. 5,802,339; and a division of U.S. application Ser. No. 08/340,183, filed Nov. 15, 1994, now U.S. Pat. No. 5,675,758, the disclosures are hereby incorporated by reference in their entirety.

BACKGROUND

System Overview

U.S. Pat. No. 5,226,126, ('126) PROCESSOR HAVING PLURALITY OF FUNCTIONAL UNITS FOR ORDERLY RETIRING OUTSTANDING OPERATIONS BASED UPON ITS ASSOCIATED TAGS, to McFarland et al., issued Jul. 6, 1993, which is assigned to the assignee of the present invention, described a high-performance X86 processor that defines the system context in which the instant invention finds particular application, and is hereby incorporated by reference. The processor has multiple function units capable of performing parallel speculative execution. The function units include a Numerics Processor unit (NP), an Integer Execution Unit (IEU), and an Address Preparation unit (AP).

Instructions are fetched and decoded by a DECoder unit (DEC), which generates tagged pseudo-operations (p-ops) that are broadcast to the functional units. Each instruction will result in one or more p-ops being issued. For the purpose of this invention the terms p-op and operation are used interchangeably. Each operation executed by the processor may correspond to one instruction or to one p-op of a multi-p-op instruction.

DEC "relabels" (or reassigns) the "virtual" register specifiers used by the instructions into physical register specifiers that are part of each p-op. This allows DEC to transparently manage physical register files within the execution units. Register relabeling (reassignment) is integral to the processor's ability to perform speculative execution. The p-ops could be viewed as very wide horizontal (largely unencoded) control words. The wide horizontal format is intended to greatly facilitate or eliminate any further decoding by the execution units. DEC performs branch prediction and speculatively issues p-ops past up to two unresolved branches. I.e., DEC fetches down and pre-decodes instructions for up to three instruction streams.

The AP unit contains a relabeled virtual copy of the general purpose registers and segment registers and has the hardware resources for performing segmentation and paging of virtual memory addresses. AP calculates addresses for all memory operands, control transfers (including protected-mode gates), and page crosses.

IEU also contains a relabeled virtual copy of the general purpose registers and segment registers (kept coherent with AP's copy) and has the hardware resources for performing integer arithmetic and logical operations. NP contains the floating-point register file and has the floating-point arithmetic hardware resources.

Each execution unit has its own queue into which incoming p-ops are placed pending execution. The execution units are free to execute their p-ops largely independent of the other execution units. Consequently, p-ops may be executed out-of-order. When a unit completes executing a p-op it sends terminations back to DEC. DEC evaluates the terminations, choosing to retire or abort the outstanding p-ops as appropriate, and subsequently commands the function units accordingly. Multiple p-ops may be retired or aborted simultaneously. A p-op may be aborted because it was downstream of a predicted branch that was ultimately resolved as being mispredicted, or because it was after a p-op that terminated abnormally, requiring intervening interrupt processing.

Aborts cause the processor state to revert to that associated with some previously executed operation. Aborts are largely transparent to the execution units, as most processor state reversion is managed through the dynamic register relabeling specified by DEC in subsequently issued p-ops.

Data Interlocks in the Existing System

Instructions that require memory or I/O references require that an effective address computation be performed. The address computation typically include references to register values that have been computed for previous instructions. An effective address may include references to a displacement field from the instruction and to base and index registers from the register file.

For the purpose of this discussion, instructions can be roughly divided into two classes: those that operate on a program's data and those that are used to compute address components such as base register and index register values. While the results of these two classes interact, there is a fair degree of independence between the classes. For example, the results of a divide instruction are not typically used as a basis for computing an address to access memory. Such an independence can not be guaranteed, but the dynamic occurrences of instructions that effect only future address computations are frequent enough to be interesting.

Instruction sequences typically have mixes of the two instruction classes. The inventors of the present invention discovered that situations can and frequently do occur in the X86 applications where a non-address class instruction precedes an address class instruction which does not depend upon tile result of the non-address class instruction, and the address class instruction precedes an instruction of either class that requires an address computation. Consider the following example:

| | | |
|---|---|---|
| DIVIDE | R3 <-- R3 op immediate value | (non-address class) |
| ADD | R5 <-- R5 op R6 | (address class) |
| SUB | R3 <-- R3 op memory [R5 + displacement value] | (requires address computation). |

When a dedicated function unit is used to process addresses, it must wait for the execution unit to finish the non-address class instruction (the DIVIDE, in the example shown) and then finish the address class instruction (the ADD) before it can proceed (with the SUB). This dependency causes an interlock of the address unit until the register value needed for the effective address becomes available.

Problems of the System Discovered by the Inventors

New designs are needed to continually improve the performance/cost ratio and stay ahead of competitive microarchitectures. As was demonstrated by example supra, the expensive hardware resources of the AP are frequently not being fully exploited due to data dependencies. It is desirable to remove such dependencies and otherwise improve performance without adversely affecting either new product schedules or cost. Thus, minor logic additions that can result in increased performance over the existing design are needed. Due to the extensive verification and compatibility testing required following changes to function units, it is further desirable to increase performance with minimal or no changes to these units.

The obvious thing to do, to increase performance in a multiple execution unit processor, is to add an additional function unit identical to an existing unit. The existing IEU makes use of a simple single-owner history stack mechanism for flag-register values. To add an additional integer execution unit would appear to require a different, multiple-owner, method for restoring flag state following an abort of a speculatively executed instruction. Such a modification would appear to require a significant increase in hardware and would significantly change the existing integer execution unit, requiring extensive verification and compatibility testing. It will be seen that the inventors did not follow this path.

SUMMARY

The existing execution units of a high-performance processor are augmented by the addition of a supplemental integer execution unit, termed the Add/Move Unit (AMU), which performs select adds and moves in parallel and out-of-order with respect to the other execution units. At small incremental cost, AMU enables better use of the expensive limited resources of an existing Address Preparation unit (AP), which handles linear and physical address generation for memory operand references, control transfers, and page crosses. AMU removes data dependencies and thereby increases the available instruction level parallelism. The increased instruction level parallelism is readily exploited by the processor's ability to perform out-of-order and speculative execution, and performance is enhanced as a result.

It is a first object of the instant invention to reduce stalls in the generation of effective addresses, and thereby increase performance.

It is a second object of the present invention to improve performance with a minimal increase in cost.

It is a third object of the current invention to more fully exploit the expensive hardware resources of the AP unit.

It is a fourth object of the immediate invention to increase performance with minimal or no changes to the existing function units.

It is an fifth object of the instant invention to implement less than full width (partial) speculative register write operations.

It is an sixth object of the present invention to minimize the logic required to implement said partial speculative register write operations.

It is a first feature of the current invention to perform adds and moves in a supplemental integer execution unit (the AMU) in parallel and out-of-order with respect to the primary (existing) integer execution unit (the IEU).

It is a second feature of the immediate invention for the primary integer execution unit to perform the flag setting for all operations executed by the secondary integer execution unit.

It is a third feature of the instant invention to implement said supplemental integer execution unit with minimal hardware.

It is a fourth feature of the present invention that M-bit operations, where M<N (N is 32-bits and M is 16-bits in the present design), are handled by merging (concatenating) the new M-bit result with the most significant (32-M)-bit portion of the old register contents when writing to the relabeled register file.

It is an advantage of said first, second, and third features that new inexpensive hardware permits existing expensive hardware to be better utilized.

It is an advantage of said first feature that minimal or no modifications are required the IEU or AP units.

It is an advantage of said second feature that the existing IEU flag history stack continues to manage flags without modification.

It is an advantage of said third feature that no termination hardware or flag-setting logic is required or implemented in said supplemental integer execution unit.

It is an advantage of said fourth feature that the result merging feature enables performing partial speculative register write operations with simple and minimal logic.

These and other features and advantages of the invention will be better understood in view of the accompanying drawings and the following detailed description, including at least one exemplary embodiment, which illustrates various objects and features thereof. The exemplary embodiment shows how these circuits can be used to improve pipeline throughput in a particular microarchitecture. The use of these circuits is not limited to the context of the exemplary embodiment.

SCHEMATIC NOTATION

Lines marked with a short diagonal indicate multi-bit signals. Multi-bit signals are sometimes also indicated by a bit range suffix, comprising the most significant bit number, a double-period delimiter, and the least significant bit number, all enclosed in angle brackets (e.g., <9 . . . 0>). Multi-bit wide components are sometimes indicated by a bit size consisting of a number followed by a capital B (e.g., 13B). It is implied that when a single-bit width signal, such as a clock phase or an enable, is connected to a multi-bit wide component, the single-bit width signal is fanned out to the corresponding number of bits. When merging two or more signals into one, or demerging two or more signals from one, the significance order of the individual component signals within the combined signal is explicitly shown with MSB and LSB labels adjacent to the merge or demerge.

DETAILED DESCRIPTION OF THE INVENTION

Add/Move Unit Description

Figure 1:
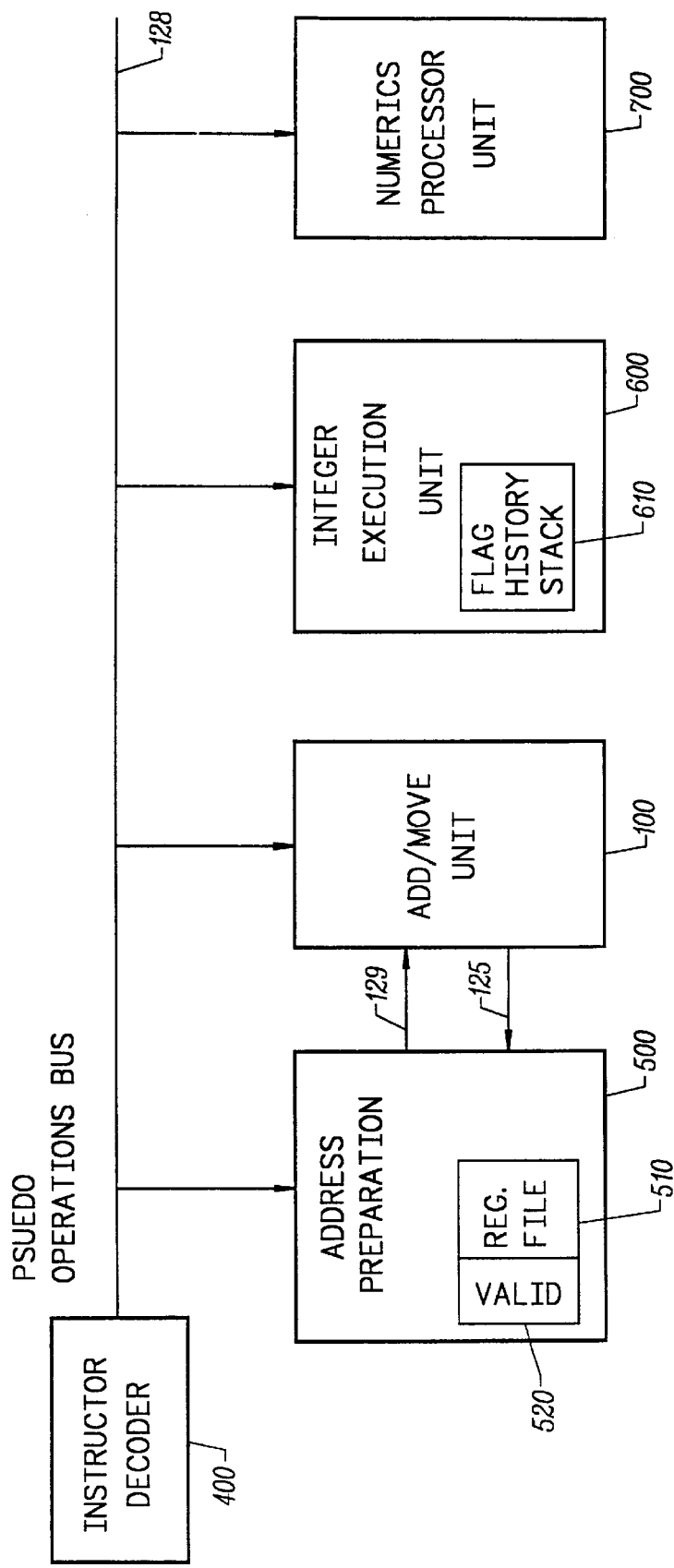
FIG. 1 diagrams the Add/Move Unit in relation to other functional units in the processor.

FIG. 1 shows the relationship of a new function unit, the Add/Move Unit (AMU) 100, to the existing AP 500. AMU 100 is a supplemental integer execution unit that performs select adds and moves, for register/register or register/immediate operands, in parallel and out-of-order with the primary integer execution unit, the previously existing IEU 600. The use of AMU 100 is controlled by configuration bits in DEC 400. None; a select set of p-ops including forms of ADD, SUB, INC, DEC, and MOV; or said select set plus OR and AND; are possible configuration choices for what p-ops will be sent to AMU 100 over p-op bus 128. P-op bus 128 also drives AP 500, IEU 600, and NP 700.

Figure 2:
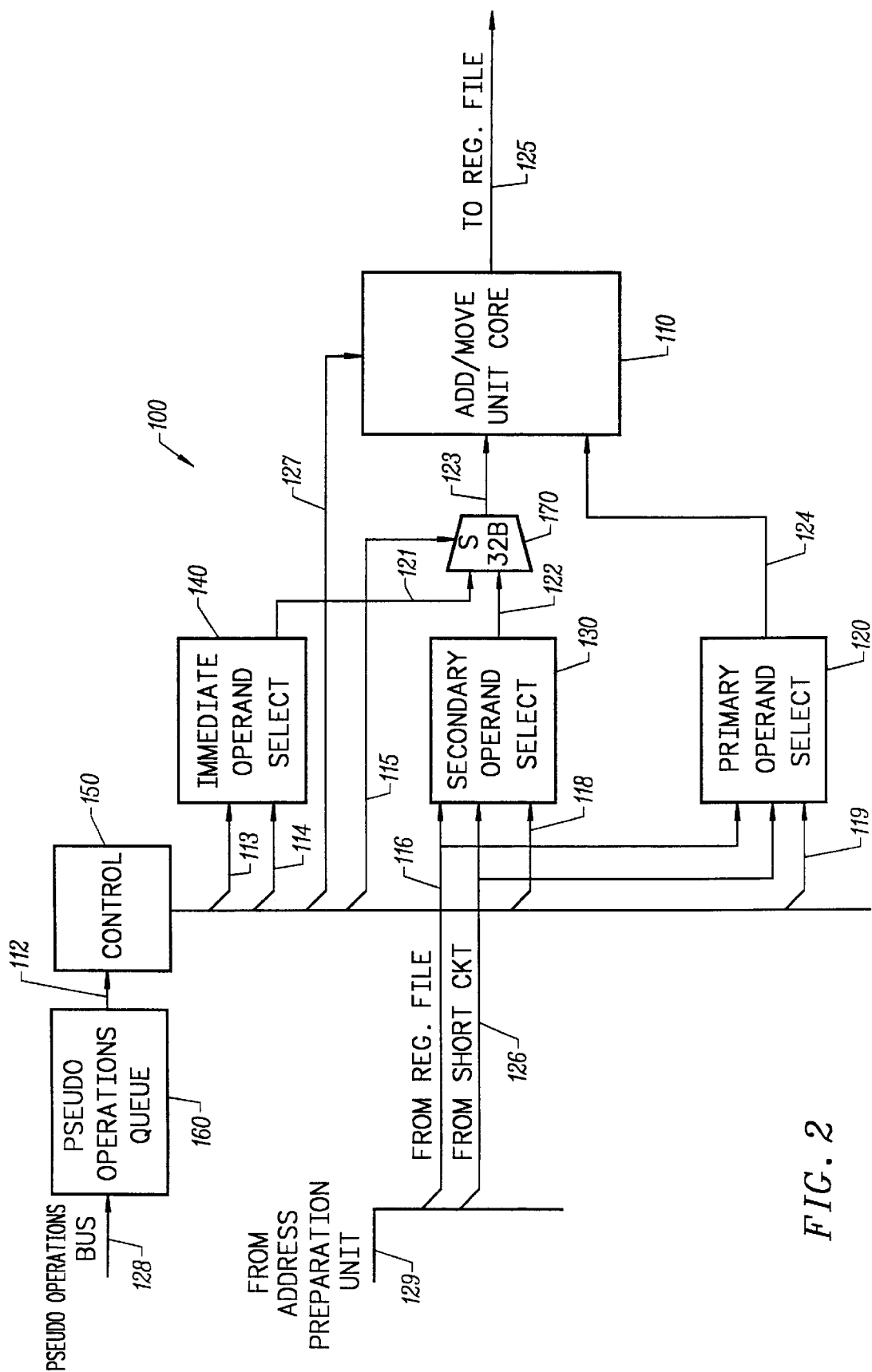
FIG. 2 is an overall block diagram of the Add/Move Unit

FIG. 2 shows that AMU 100 has its own queue 160 of p-ops issued by the instruction decoder (DEC) 400 that are marked for execution by AMU. Control 150 receives p-ops 112 and generates multiple control signals (113, 114, 127, 115, 118, and 119) to be discussed. Signal 129 from AP, includes signal 116, representing operands read from AP's Register File. and signal 126, representing operands about to be written into the Register File, which are taken from various short circuit paths. Secondary input 123 is selected by mux 170 from an immediate operand 121 or a register operand 122, according to secondary input control 115. The immediate operand 121 is selected by Immediate Operand Select (unencoded mux logic) 140 from pipelined p-op fields 113, according to immediate control 114. Register operand 122 is selected by Secondary Operand Select (unencoded mux logic) 130 from signal 116 or 126, both discussed supra, according to secondary operand control 118: Primariy input 124 is the primary operand selected by Primary Operand Select (unencoded mux logic) 120 from signal 116 and 126, according to primary operand control 119. AMU 100 has an Add/Move Unit Core (AMU Core) 110, which generates results 125, for writing into the Register File, according to Core Control 127.

Figure 3:
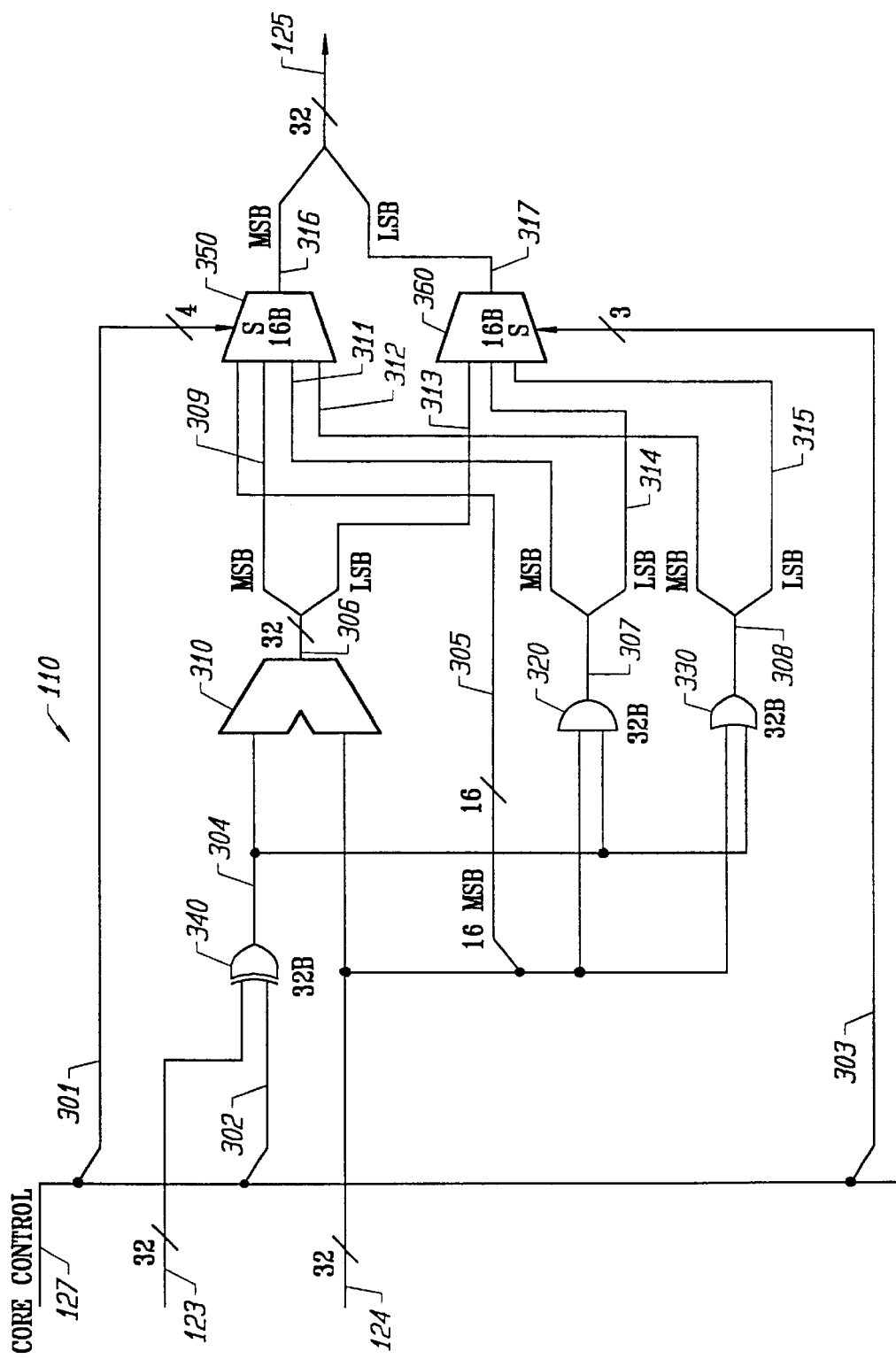
FIG. 3 shows the Add/Move Unit Core.
Figure 4:
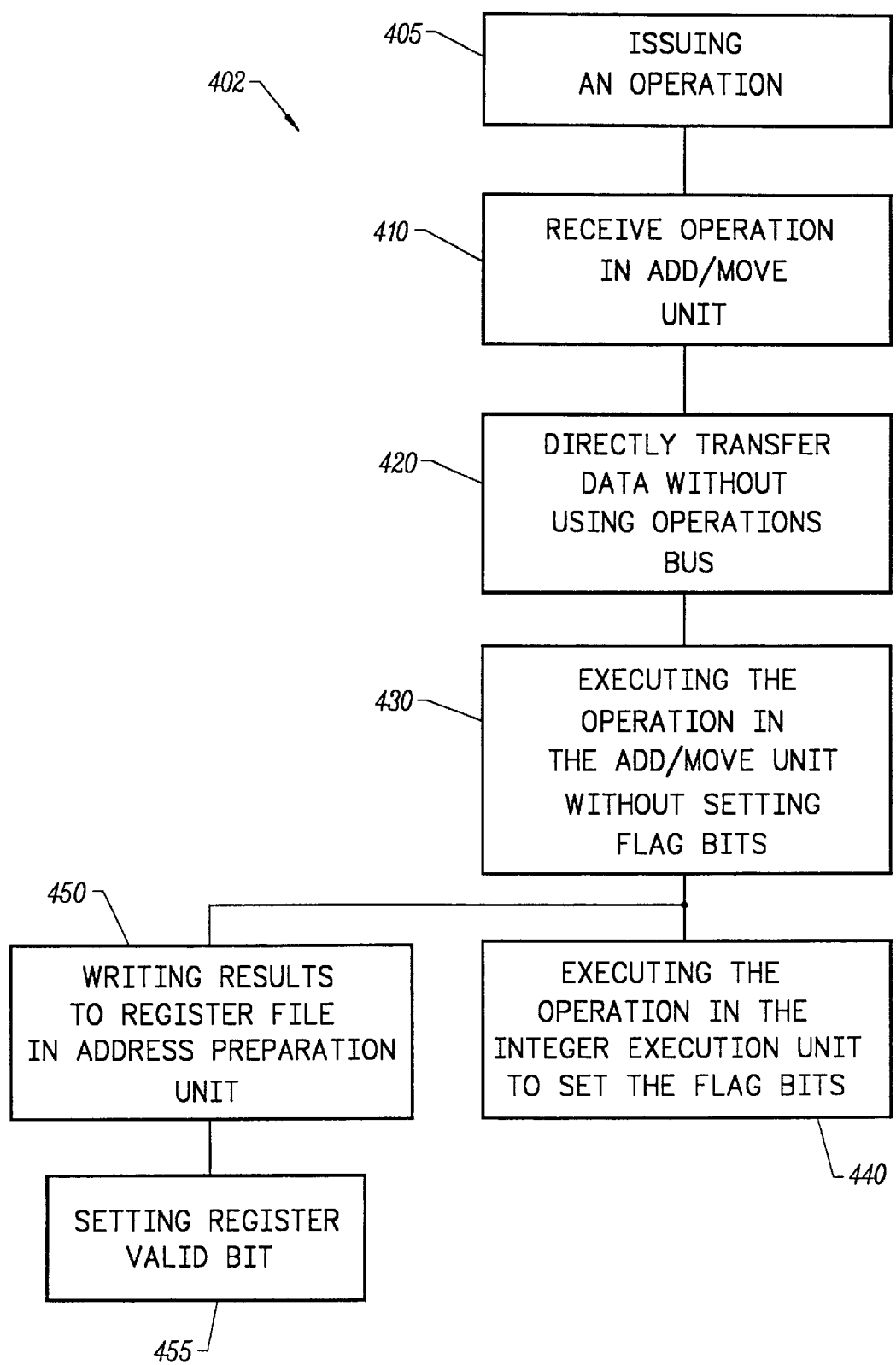
FIG. 4 shows a flow diagram of a method of operation for the Add/Move unit.

The AMU core 110, drawn in FIG. 3, comprises a two input adder 310 and other combinational logic (340, 320, 330, 350, and 360) that allows it to compute additions, subtractions, logical OR, and logical AND functions. Primary input 124 is coupled to the lower input of adder 310. Secondary input 123 is coupled to XOR-gate 340, whose output 304 is coupled to the upper input of adder 310. XOR output 304 is the true or complement version of secondary input 123, according to control 302. This facilitates carrying out subtractions by the AMU. AND-gate 320 is coupled to both the primary input 124 and the XOR output 304. OR-gate 330 is likewise coupled to both the primary input 124 and the XOR output 304. The result 125 is composed of a most significant portion 316 and a least significant portion 317, which are outputs of unencoded muxes 350 and 360, respectively. Mux control 301 selects one of: signal 305, the most significant 16-bits of primary input 124; signal 309, the most significant 16-bits of the adder output 306; signal 311, the most significant 16-bits of AND-gate 320's output 307; or signal 312, the most significant 16-bits of OR-gate 330's output 308. Likewise mux control 303 selects one of: signal 313, the least significant 16-bits of the adder output 306; signal 314, the least significant 16-bits of AND-gate 320's output 307, or signal 315, the least significant 16-bits of OR-gate 330's output 308.

The AMU 100 shares with AP the use of two read ports to AP's Register File. Tile AMU 100 can read register values from the Register File and can access immediate data values from the instruction queue (p-op queue) 160.

The AMU also shares a write port with AP in the Register File. The result of the AMU's computation is stored into a register in the Register File for later reference by AP 500 or AMU 100. A set of register valid bits are maintained in AP 500 to-indicate when a register has a valid result in it. When DEC 400 issues a p-op, AP 500 clears the valid bit associated with the destination physical register (as specified by the p-op). The valid bit is used as an interlock for both effective address generation in AP 500 and computation by the AMU 100. The valid bit becomes set again whenever a result is written into the destination physical register. Results may originate from AP 500 internally, from AMU 100, from memory, or from an IEU 600 register coherency update.

System Level Considerations in a First Embodiment

In a first embodiment, which has been reduced to practice, the processor is implemented in two main chips (one being the NP unit and the other being the remaining function units) and an external level-two (L2) SRAM cache. A typical computer will include a memory controller chip as well.

The integer props issued to AMU 100 are limited to the subset of ADD, SUB, INC, DEC, and MOV instructions (and optionally OR and AND instructions) that use only Register or Immediate operands. This is consistent with the fact that AMU 100 does not have hardware support for memory operands, reading the flag-register, multiply, divide, or any kind of shift.

IEU 600 uses the flag history stack disclosed in '126 supra to support speculative execution. The history stack does not support ownership of the flags by any other function unit than IEU 600. The AMU 100 does not set the flag bits associated with the instructions it executes. All instructions executed by AMU 100 are also (eventually) executed by IEU 600. This is done so that the flag bits are set according to the expected X86 behavior for these instructions.

The AMU 100 reduces data dependencies that might otherwise stall effective address generation, upon which memory operand reads interlock. Furthermore, the instruction associated with the memory operand read must in turn interlock with the return of the memory operand. Because AP 500, IEU 600, and AMU 100, all execute out-of-order, it is possible to hide the memory operand read (by the memory system), the memory operand's effective address generation (by AP 500), and the (first-pass) calculation of a component of the effective address (by AMU 100), all behind a long operation in the IEU 600.

In the example given in the BACKGROUND section, while the execution unit is computing a result (for the DIVIDE), AMU 100 can be executing the ADD result. As soon as the AMU result is ready, AP 500 can proceed to compute the address for the memory reference of the SUB instruction. This allows the memory to be accessed earlier and the memory value returned earlier for the execution unit to use it on the SUB instruction. Note however, that in the first embodiment, IEU 600 must still execute the ADD in order to update the flag-register.

The scenario under which the addition of AMU 100 is beneficial can be described more generically as a three instruction sequence consisting of complex-integer (IEU 600 only), reduced-integer (IEU 600 and AMU 100), and required address calculation (generally IEU 600 and AP 500) instructions. Pipeline performance will be improved for complex-integer instructions such as multiply, divide, and instructions with a memory operand—especially when there is a cache-miss associated with said memory operand.

Elimination of Most Redundant Operations in a Second Embodiment

In a second, prophetic, embodiment, the flag history stack is replaced with a reassigned (relabeled) flag-register file, managed using the same techniques taught in '126 for managing the reassigned register file. The flag-bits are stored in the file as an atomic unit, using physical register addresses. That is, relabeling is done at the flag-register level, not the flag-bit level. In the second embodiment, all integer related p-ops, except INC and DEC, are assigned either to the AMU or IEU, but not both. Integer p-ops issued to the AMU include those ADD, SUB, and MOV instructions that use only Register or Immediate operands.

The AMU in the second embodiment performs only register results for INC and DEC, leaving IEU to perform the flag setting, as in the first embodiment. This approach is taken, because flag reassignment is done at the flag-register level and INC and DEC do not modify the same set of flags as the ADD, SUB, and MOV instructions. To do otherwise is believed to require more hardware than is justified by the performance gains.

Result Merging in the Add/Move Unit

Performing speculative and out-of-order execution for a precise exception architecture requires an ability to restore the state of the machine. As mentioned supra, the processor of the illustrated embodiment uses register reassignment (relabeling) techniques. In this approach, virtual register labels, associated with the macro-architectural register names, are assigned (mapped) to a set of physical registers, larger than the macro-architectural register set. Copies of old results are maintained until it is safe to overwrite them. New results are written into free registers, which are not storing any of the old results. Only when the instruction associated with a new result is successfully retired, is it safe to overwrite the associated old result. To restore a macro-architectural register to a previous value, the assignment (mapping) is changed so that the appropriate virtual register name maps to the old result. In such a speculative execution computer where general registers (GREGs) are reassigned, the general form of an operation is:

GREGA'←GREGA op GREGB.

For 32-bit operations, GREGA' holds the computed results of the 32-bit operation on the two 32-bit source operands held in general registers A and B. In a preferred embodiment, the relabeled register file directly handles only such full-width N-bit (currently 32-bit) results.

For 16-bit operations, however, only a 16-bit computed result is available to update the 16 LSB of GREGA'. The 16 MSB of general register A must remain unchanged in general register A' since it is unaffected by the computation. Consequently the operation can be broken into two pieces:

| | |
|---|---|
| GREGA'[16 MSB] <-- GREGA[16 MSB] | (for the 16 MSB). |
| GREGA'[16 LSB] <-- GREGA[16 LSB] op GREGB[16 LSB] | (for the 16 LSB). |

The copying of the 16 MSB from the original general register A into the 16 MSB of the newly assigned general register A' can be described as copying the old destination's general register MSB portion into the new destination's general register MSB portion. This is referred to as result merging. In FIG. 3, result merging is accomplished in the AMU core 110 via the merge of mux 350's output 316 and mux 360's output 317, into signal 125, while signal 305 is selected by mux 350.

For 8 bit operations, the concept is extended to:

| | |
|---|---|
| GREGA'[24 MSB] <-- GREGA[24 MSB] | (for the 24 MSB) |
| GREGA'[8 LSB] <-- GREGA[8 LSB] op GREGB[8 LSB] | (for the 8 LSB). |

In summary, M-bit operations, where M<N (N is 32-bits and M is limited to 16-bits in the illustrated embodiment of the AMU), are handled by merging (concatenating) the new M-bit result with the most significant (32M)-bit portion of tile old register contents when writing to the relabeled register file. In the present processor, only IEU performs 32, 16, or 8-bit operations, while AP and AMU can handle only 32 or 16-bit operations. While there are alternatives to the result merging technique illustrated, it is the preferred approach as it requires a simpler logic interface and requires less area to implement.

CONCLUSION

Although the present invention has been described using particular illustrative embodiments, it will be understood that many variations in construction, arrangement and use are possible within the scope of the invention. For example, tile function of multiplexors could be implemented using alternate methods, such as AND-OR gating, or 3-state bus techniques. Finally, the signal polarities used were chosen for clarity of expression. Different logic polarities may be observed in practice in order to minimize logic gates. The present invention is thus to be considered as including all possible modifications and variations encompassed within the scope of the appended claims.

We claim:

1. A method of operating a microprocessor comprising:

issuing a first operation;

issuing a second operation, the second operation being after the first operation in program order;

issuing a third operation including an address calculation that is dependent on results of the second operation;

executing the first operation in a first execution unit;

executing the second operation in the first execution unit;

executing the second operation in a second execution unit;

determining register results based on said executing the second operation in the second execution unit;

updating a register file with said register results; and calculating an address calculation of the third operation in a third execution unit using the updated register file before the second operation has completed in the first execution unit.

2. The method of claim 1 further comprising executing the second operation in the first execution unit after completing execution of the first operation in the first execution unit.

3. The method of claim 2 wherein the first execution unit sets flag bits upon execution of the second operation.

4. The method of claim 1 wherein the second execution unit does not set flag bits upon execution of the second operation.

5. The method of claim 4 wherein the second execution unit is capable of executing operations selected from a group consisting of add, subtract, OR, AND, increment, decrement, and move.

6. The method of claim 1 wherein the first operation is capable of executing a plurality of operations and the second execution unit is not capable of executing the operations in the plurality of operations.

7. The method of claim 1 wherein the address calculation of the third operation includes a calculation of an effective address.

8. The method of claim 1 further comprising an operations bus wherein the second execution unit receives operations from the operations bus and the second execution unit updates the register file using a communication path other than the operations bus.

9. The method of claim 1 wherein said second execution unit comprises:

an add/move unit core, generating the register results;

an immediate operand select selecting an immediate operand of said second operation;

a secondary operand select selecting a secondary operand of the said second operation;

a primary operand select selecting a primary operand of the said second operation; and an operand multiplexer selectively coupling an output from the immediate operand select or the secondary operand select to the add/move unit core.

10. The method of claim 9 wherein the add/move core unit comprises:

an arithmetic unit having a first operand input coupled to the operand multiplexer and a second operand input coupled to the primary operand select, wherein depending on a state of a plurality of control signals based on said second operation, the arithmetic unit adds or subtracts the first operand input and second operand input;

an AND gate coupled to AND the second operand input and the first operand input; and an OR gate coupled to OR the first operand input and the second operand input.

11. The method of claim 9 wherein the add/move core unit comprises:

an arithmetic unit having a first operand input coupled to the operand multiplexer and a second operand input coupled to the primary operand select, wherein depending on a state of a plurality of control signals based on said second operation, the arithmetic unit adds or subtracts the first operand input and second operand input;

an AND gate coupled to AND the second operand input and the first operand input;

an OR gate coupled to OR the first operand input and the second operand input;

a MSB multiplexer generating a most significant portion of bits of the results of the add/move unit core, comprising:

a first input coupled to a most significant portion of the first operand input;

a second input coupled to a most significant portion of an output of the arithmetic unit;

a third input coupled to a most significant portion of an output of the AND gate; and a fourth input coupled to a most significant portion of an output of the OR gate; and an LSB multiplexer generating a least significant portion of bits of the results of the add/move unit core, comprising:

a first input coupled to a least significant portion of an output of the arithmetic unit;

a second input coupled to a least significant portion of an output of the AND gate; and a third input coupled to a least significant portion of an output of the OR gate.

12. The method of claim 1 further comprising storing a flag result of said second operation in a flag-register file using physical register addresses.

13. The method of claim 1 wherein executing the second operation comprises:

storing said second operation in an operations queue;

receiving said second operation from the operations queue in a control block; and generating wing said control block a plurality of control signals indicative of said second operation.

14. The method of claim 1 further comprising:

selecting an immediate operand of said second operation;

selecting a primary operand of said second operation;

selecting a secondary operand of said second operation; and providing said immediate operand or said secondary operand to an add/move unit core.

15. The method of claim 14 further comprising:

providing the primary operand to said add/move unit core; and in said add/move unit core, operating on said primary operand and either said immediate operand or said secondary operand.

16. The method of claim 15 further comprising transferring results from said add/move unit core into said register file.

17. The method of claim 14 further comprising calculating a result in said add/move unit core a sum or difference, depending on said second operation, of said primary operand and either said immediate operand or said secondary operand.

18. The method of claim 1 further comprising:

calculating in an arithmetic unit of an add/move unit core a result based on selected operands in said second operation;

partitioning said result into a most significant portion and a least significant portion; and generating an output of said add/move unit core using said least significant portion of said result and a most scant portion of one of said operands in said second operation.

19. The method of claim 18 further comprising:

storing said output in a location in said register file; and overwriting said location in said register file only when the first operation is successfully retired.

20. The method of claim 1 further comprising:

providing an AND result of selected operands in said second operation; and providing an OR result of said selected operands in said second operation.

21. The method of claim 20 further comprising:

calculating an arithmetic result using said selected operands in said second operation;

partitioning said AND result, OR result, and arithmetic result into most significant and least significant portions; and forming an output from said most significant and least significant portions of said results.

22. The method of claim 21 wherein said output of said forming step is a concatenation of said most significant portion and least significant portion of said arithmetic result.

23. The method of claim 21 wherein said output of said forming step is a concatenation of said most significant portion of said arithmetic result and least significant portion of said AND result or said OR result.

24. The method of claim 21 wherein said output of said forming step is a concatenation of said least significant portion of said arithmetic result and most significant portion of said AND result or said OR result.

25. The method of claim 21 wherein said output of said forming step is a concatenation of said least significant portion of said arithmetic result and most significant portion of one of said selected operands.

26. The method of claim 1 wherein said second operations result is at least thirty-two bits wide.

27. The method of claim 1 further comprising:

storing the first, second and third operations in a first queue; and storing said second operation in a second queue, wherein the first execution unit receives the first and second operation from the first queue and the second execution unit receives operations from the second queue.

28. The method of claim 27 further comprising receiving said second operation for said second queue in a control block and generating a plurality of control signals.

29. The method of claim 1 wherein the third execution unit is dedicated to address calculations.

30. A method of operating a microprocessor comprising:

issuing a first operation on an operations bus;

issuing a second operation on the operations bus, the second operation being after the first operation in program order;

issuing a third operation on the operations bus including an address calculation that is dependent on results of the second operation;

executing the first operation in a first execution unit;

executing the second operation in the first execution unit;

executing the second operation in a second execution unit;

updating a register file in a third execution unit based on the execution of the second operation in the second execution unit using a communication path other than the operations bus; and calculating the address calculation of the third operation in the third operations unit using the updated register file before the second operation has completed in the first execution unit.

31. The method of claim 30 wherein the communication path is a dedicated path between the second execution unit and the third execution unit.

32. The method of claim 30 further comprising reading the register file by the second execution unit.

33. The method of claim 30 wherein a write port to the register file is shared by the second execution unit and third execution unit.

34. A method of operating a microprocessor comprising:

issuing a first operation;

issuing a second operation, the second operation being after the first operation in program order;

issuing a third operation including an address calculation that is dependent on results of the second operation;

executing the first operation in a first execution unit;

executing the second operation in the first execution unit and updating a flag bit;

executing the second operation in a second execution unit and determining register results but not updating the flag bit;

updating a register file with said register results; and calculating the address calculation of the third operation in a third execution unit before the second operation has completed in the first execution unit.

35. The method of claim 34 wherein the flag bit is stored in a flag history stack.

* * * * *